(12) United States Patent
Yumii

(10) Patent No.: US 12,240,273 B2
(45) Date of Patent: Mar. 4, 2025

(54) PNEUMATIC TIRE

(71) Applicant: BRIDGESTONE CORPORATION, Tokyo (JP)

(72) Inventor: Keita Yumii, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 286 days.

(21) Appl. No.: 17/614,617

(22) PCT Filed: May 27, 2020

(86) PCT No.: PCT/JP2020/021003
§ 371 (c)(1),
(2) Date: Nov. 29, 2021

(87) PCT Pub. No.: WO2020/250691
PCT Pub. Date: Dec. 17, 2020

(65) Prior Publication Data
US 2022/0227179 A1    Jul. 21, 2022

(30) Foreign Application Priority Data
Jun. 14, 2019   (JP) .................................. 2019-110822

(51) Int. Cl.
*B60C 11/12*      (2006.01)
*B60C 19/00*      (2006.01)

(52) U.S. Cl.
CPC ...... *B60C 11/1281* (2013.01); *B60C 11/1204* (2013.01); *B60C 11/1236* (2013.01); *B60C 19/002* (2013.01)

(58) Field of Classification Search
CPC ............. B60C 11/1204; B60C 11/1236; B60C 11/1281; B60C 19/002
See application file for complete search history.

(56) References Cited

U.S. PATENT DOCUMENTS 4,078,596 A * 3/1978 Nakayama ............... B60C 11/04
                                                    152/DIG. 3
8,770,240 B2   7/2014 Bervas et al.
(Continued)

FOREIGN PATENT DOCUMENTS

CN    107074029 A    8/2017
CN    107614291 A    1/2018
(Continued)

OTHER PUBLICATIONS

Machine translation for Japan 2019-116194 (Year: 2023).*
(Continued)

*Primary Examiner* — Steven D Maki
(74) *Attorney, Agent, or Firm* — Oliff PLC

(57) ABSTRACT

A pneumatic tire includes, on a tread surface, circumferential main grooves extending in the tread circumferential direction, rib-like land portions defined between circumferential main grooves adjacent in the tread width direction or by circumferential main grooves and tread edges, and resonators, arrayed circumferentially in the rib-like land portions, each including a narrowed neck and an air chamber. The narrowed neck is a widthwise sipe opening at one end to the circumferential main groove that defines the rib-like land portion, extending therefrom in the tread width direction, and terminating at another end within the rib-like land portion. The air chamber is a circumferential sipe connected to the other end of the widthwise sipe, extending in the tread circumferential direction, terminating at both ends within the rib-like land portion, and including a first widened portion, at the sipe bottom, with a larger sipe width than at the tread surface side.

20 Claims, 3 Drawing Sheets

(56) References Cited

U.S. PATENT DOCUMENTS

| | | | |
|---|---|---|---|
| 10,773,554 | B2 | 9/2020 | Hatanaka |
| 2011/0017374 | A1* | 1/2011 | Bervas .................... B60C 11/12 |
| | | | 152/209.18 |
| 2013/0263984 | A1* | 10/2013 | Bervas ................ B60C 11/0323 |
| | | | 152/154.2 |
| 2017/0015144 | A1 | 1/2017 | Ogihara |
| 2017/0253087 | A1 | 9/2017 | Shimura |
| 2019/0001753 | A1 | 1/2019 | Hayashi |

FOREIGN PATENT DOCUMENTS

| | | | |
|---|---|---|---|
| EP | 989000 A2 * | 3/2000 | |
| FR | 2 926 037 A1 | 7/2009 | |
| JP | 01-101205 A * | 4/1989 | |
| JP | 2001-063320 A * | 3/2001 | |
| JP | 2003-159911 A | 6/2003 | |
| JP | 2006-082651 A * | 3/2006 | |
| JP | 2009-090824 A | 4/2009 | |
| JP | 2011-001004 A | 1/2011 | |
| JP | 2011-20591 A | 2/2011 | |
| JP | 2011-509213 A | 3/2011 | |
| JP | 2011-143897 A | 7/2011 | |
| JP | 2013-539735 A | 10/2013 | |
| JP | 2017-124712 A | 7/2017 | |
| JP | 2017-185889 A | 10/2017 | |
| JP | 2017-222280 A | 12/2017 | |
| JP | 2019-116194 A * | 7/2019 | |

OTHER PUBLICATIONS

Machine translation for Japan 2001-063320 (Year: 2023).*
Machine translation for Europe 989000 (Year: 2023).*
Machine translation for Japan 2006-082651 (Year: 2023).*
Machine translation for Japan 01-101205 (Year: 2023).*
Partial machine translation for Japan 01-101205 (Year: 2023).*
Jul. 14, 2020 International Search Report issued in International Patent Application No. PCT/JP2020/021003.
Sep. 21, 2022 Search Report issued in Chinese Patent Application No. 202080040124.6.
May 24, 2023 Extended European Search Report issued in European Patent Application No. 20822002.0.
Dec. 14, 2021 International Preliminary Report on Patentability issued in International Patent Application No. PCT/JP2020/021003.

* cited by examiner

PNEUMATIC TIRE

TECHNICAL FIELD

The present disclosure relates to a pneumatic tire.

BACKGROUND

As technology for enhancing the quietness of a tire during vehicle driving, it has been proposed to reduce the air column resonance sound by providing resonators on the tread surface of the tire. For example, see Patent Literature (PTL) 1.

CITATION LIST

Patent Literature

PTL 1: JP 2009-090824 A

SUMMARY

Technical Problem

Although the technology described in PTL 1 can reduce the air column resonance sound, the resonators arranged in the tread circumferential direction themselves become a source of pattern noise, leading to a risk that the quietness of the tire might not be sufficiently obtained.

The present disclosure aims to provide a pneumatic tire with enhanced quietness by reducing air column resonance sound while suppressing the generation of pattern noise.

Solution to Problem

A summary of the present disclosure is as follows.

A pneumatic tire of the present disclosure includes, on a tread surface, a plurality of circumferential main grooves extending in a tread circumferential direction, and a plurality of rib-like land portions, each rib-like land portion being defined between circumferential main grooves adjacent in a tread width direction among the plurality of circumferential main grooves, or by the circumferential main groove and a tread edge; and a plurality of resonators arrayed in the rib-like land portion in the tread circumferential direction, each resonator including a narrowed neck and an air chamber, wherein the narrowed neck is a widthwise sipe opening at one end to the circumferential main groove that defines the rib-like land portion, extending from the one end in the tread width direction, and terminating at another end within the rib-like land portion, and the air chamber is a circumferential sipe connected to the other end of the widthwise sipe, extending in the tread circumferential direction, terminating at both ends within the rib-like land portion, and including a first widened portion, at a sipe bottom side, in which a sipe width is larger than at the tread surface side.

Here, the "tread surface" refers to the entire tread surface in the tread circumferential direction that comes into contact with the road surface when the pneumatic tire is mounted on an applicable rim, filled to a prescribed internal pressure, and subjected to the maximum load.

The "circumferential main groove" refers to a groove extending in the tread circumferential direction and having an opening width of 2 mm or more at the aforementioned tread surface when the pneumatic tire is mounted on an applicable rim, filled to a prescribed internal pressure, and under no load.

The "circumferential sipe" refers to a sipe extending in the tread circumferential direction and having an opening width of less than 2 mm at the aforementioned tread surface when the pneumatic tire is mounted on an applicable rim, filled to a prescribed internal pressure, and under no load.

The "widthwise sipe" refers to a sipe extending in the tread width direction and having an opening width of less than 2 mm at the aforementioned tread surface when the pneumatic tire is mounted on an applicable rim, filled to a prescribed internal pressure, and under no load.

The "tread edges" refer to the outermost points of the aforementioned tread surface on both sides in the tire width direction.

A "rib-like land portion" refers to a land portion that is not completely divided in the tread circumferential direction by a widthwise groove or widthwise sipe extending in the tread width direction.

In the present specification, the "applicable rim" refers to a standard rim of an applicable size, such as the Measuring Rim in the STANDARDS MANUAL of the European Tyre and Rim Technological Organisation (ETRTO) in Europe or the Design Rim in the YEAR BOOK of the Tire and Rim Association, Inc. (TRA) in the USA, that is described, or will be described in the future, in industrial standards effective in the region where the tire is manufactured and used, such as the YEAR BOOK published by the Japan Automobile Tyre Manufacturers Association (JATMA) in Japan, the STANDARDS MANUAL of the ETRTO, and the YEAR BOOK of the TRA. (In other words, the "rim" encompasses not only current sizes but also sizes that may be included in industrial standards in the future. An example of the "size that will be described in the future" is the size described under "future developments" in the ETRTO Standards Manual 2013). In the case of a size not specified in the aforementioned industrial standards, the "rim" refers to a rim whose width corresponds to the bead width of the tire.

The "prescribed internal pressure" represents the air pressure (maximum air pressure) corresponding to the maximum load capability of a single wheel in an applicable size/ply rating described by the aforementioned JATMA or the like. In the case of a size not listed in the industrial standards, the "specified internal pressure" refers to the air pressure (maximum air pressure) corresponding to the maximum load capability prescribed for each vehicle on which the tire is mounted.

The "maximum load" refers to the load corresponding to the aforementioned maximum load capability.

Advantageous Effect

According to the present disclosure, a pneumatic tire with enhanced quietness by reducing air column resonance sound while suppressing the generation of pattern noise can be provided.

DETAILED DESCRIPTION

Embodiments of the present disclosure are described below in detail with reference to the drawings.

The internal structure and the like of the pneumatic tire (hereinafter referred to simply as the tire) can be the same as those of conventional tires.

As an example, the tire can have a pair of bead portions, a pair of sidewall portions connected to the pair of bead portions, and a tread portion disposed between the pair of sidewall portions. The tire can also have a carcass extending toroidally between the pair of bead portions and a belt disposed on the radially outward side of a crown portion of the carcass.

Unless otherwise specified, the dimensions and the like refer to the dimensions and the like when the tire is mounted on an applicable rim, filled to the prescribed internal pressure, and under no load.

Figure 1:
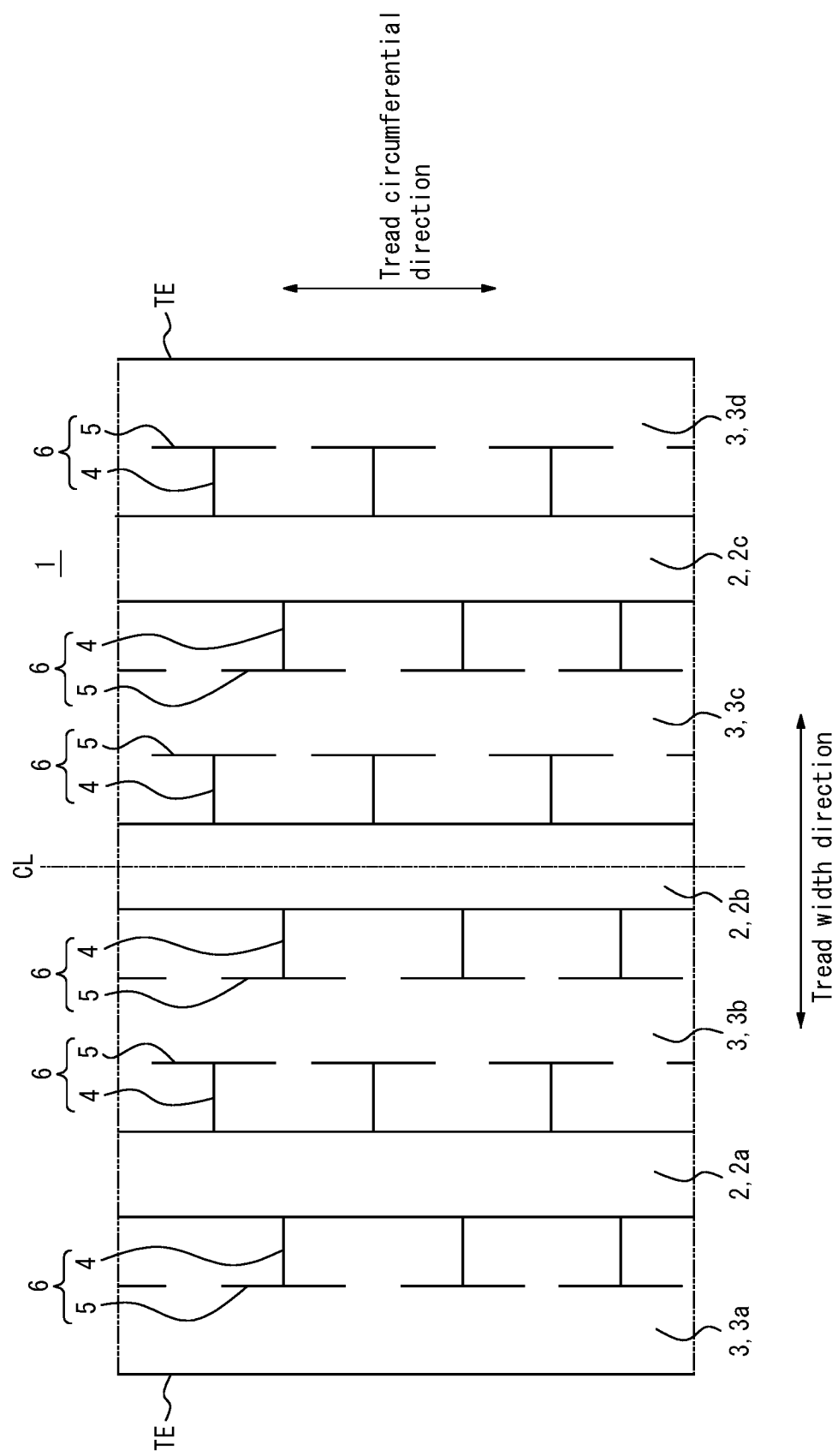
FIG. 1 is a developed view schematically illustrating a tread pattern of a pneumatic tire according to an embodiment of the present disclosure.

FIG. 1 is a developed view schematically illustrating a tread pattern of a pneumatic tire according to an embodiment of the present disclosure.

As illustrated in FIG. 1, the tire in the present example includes, on a tread surface 1, a plurality (three in the illustrated example) of circumferential main grooves 2 (2a, 2b, 2c) extending in the tread circumferential direction, and a plurality (four in the illustrated example) of rib-like land portions 3 (3a, 3b, 3c, 3d) defined between circumferential main grooves 2 adjacent in the tread width direction among the plurality of circumferential main grooves 2, or by a circumferential main groove (2a, 2c) and a tread edge TE. In the present example, one circumferential main groove 2b is positioned on the tire equatorial plane CL, and the other circumferential main grooves 2a, 2c are respectively positioned in one half and the other half, in the tread width direction, divided by the tire equatorial plane CL. In the present example, two rib-like land portions 3 are arranged in each tread widthwise half. As illustrated, the rib-like land portions 3b, 3c are rib-like land portions by the center in the tread width direction, and the rib-like land portions 3a, 3d are rib-like land portions adjacent to the tread edges TE.

In the example illustrated in FIG. 1, the number of circumferential main grooves 2 is three, but the number can be two or can be four or more. Accordingly, the number of rib-like land portions 3 can also be three, or can be five or more. In the present example, all of the land portions are rib-like land portions 3, but it suffices for at least one of the land portions to be a rib-like land portion, and some of the land portions may be land portions that are not rib-like, i.e., block-shaped land portions.

The groove width (opening width (opening width measured perpendicular to the extending direction of the groove in plan view)) of the circumferential main groove 2 is not particularly limited, since the groove width depends on the number of circumferential main grooves 2, but can, for example, be between 2 mm and 18 mm in the case of an ordinary passenger vehicle tire. Similarly, the groove depth (maximum depth) of the circumferential main groove 2 is not particularly limited, but can, for example, be between 5 mm and 9 mm.

In the illustrated example, the circumferential main grooves 2 all extend along the tread circumferential direction (without inclination) in plan view of the tread surface 1, but at least one of the circumferential main grooves 2 may extend at an inclination relative to the tread circumferential direction. In this case, the circumferential main groove 2 may be inclined at an angle of, for example, 5° or less relative to the tread circumferential direction. In the illustrated example, all of the circumferential main grooves 2 extend straight in the tread circumferential direction, but at least one of the circumferential main grooves 2 may extend in the tread circumferential direction in a shape such as a zigzag shape or a curved shape.

As illustrated in FIG. 1, the tire of the present embodiment includes a plurality of resonators 6 arrayed in each rib-like land portion in the tread circumferential direction, each resonator 6 including a narrowed neck 4 and an air chamber 5. In the present example, the resonators 6 are so-called Helmholtz-type resonators. For example, the resonance frequency f of the Helmholtz-type resonator 6 can be expressed by the following equation, where the length of the narrowed neck 4 is $1_h$, the cross-sectional area is S, the radius of a circle having the cross-sectional area is r, the volume of the air chamber 5 is V, and the speed of sound is c.

$$f=(c/2\pi)\times(S/(1_h+1.3r)V)^{1/2} \quad \text{(Equation 1)}$$

As described below, in the present embodiment, the narrowed neck 4 is a widthwise sipe, the air chamber 5 is a circumferential direction sipe, and these sipes are often partially blocked during ground contact. Equation 1 is therefore preferably modified appropriately using one or more correction factors. As an example, Equation 2 below can be used.

$$f=(c/2\pi)\times(S/(1_h+1.3r)V)^{1/2}+C1 \quad \text{(Equation 2)}$$

(Here, C1 is a correction factor.)

In the illustrated example, resonators 6 are provided in each rib-like land portion 3, but it suffices to provide resonators 6 in any one or more of the rib-like land portions 3. For example, the resonators 6 may be provided only in the rib-like land portions 3b, 3c by the center in the tread width direction, or only in the rib-like land portions 3a, 3d adjacent to the tread edges TE. For example, when a rib-like land portion 3 is on the tire equatorial plane CL, the resonators 6 may be provided only on the rib-like land portion 3 on the tire equatorial plane CL.

In the illustrated example, two rows of resonators 6 are provided in the rib-like land portions 3b, 3c by the center in the tread width direction. The narrowed necks 4 of the resonators 6 in one row connect to the circumferential main groove 2b that defines the rib-like land portions 3b, 3c on one side, and the narrowed necks 4 of the resonators 6 in the other row connect to the circumferential main grooves 2a, 2c that define the rib-like land portions 3b, 3c on the other side. However, when the resonators 6 are provided in a rib-like land portion 3 which is defined between circumferential main grooves 2, it is possible to provide only one row of the resonators 6. The narrowed necks 4 of the resonators 6 can be connected to the circumferential main groove 2 on either side in this case.

In the rib-like land portions 3a, 3d adjacent to the tread edges TE in the illustrated example, the resonators 6 are provided in a single row, and the narrowed necks 4 of the resonators 6 are connected to the circumferential main grooves 2a, 2c that define the rib-like land portions 3a, 3d.

In each of the rib-like land portions 3b, 3c by the center in the tread width direction in the illustrated example, the resonators 6 in one row and the resonators 6 in the other row are arranged so that the positions of the narrowed necks 4 (which are widthwise sipes, as described below) in the tread circumferential direction do not overlap when projected onto each other in the tread width direction (in the present example, the narrowed necks 4 of the resonators 6 in the other row are positioned exactly at the center, in the tread circumferential direction, of the narrowed necks 4 of two resonators 6 adjacent in the tread circumferential direction in the one row). This can further suppress the pattern noise caused by the resonators 6. The position of the narrowed necks 4 in the tread circumferential direction may be the same between the one row and the other row, and in the case of different positions, the narrowed necks 4 of the resonators 6 in the other row need not be positioned exactly at the center but rather may be positioned anywhere in the tread circumferential direction between the narrowed necks 4 of two resonators 6 adjacent in the tread circumferential direction in the one row.

In the illustrated example, the resonators 6 in each of the rib-like land portions 3a, 3d adjacent to the tread edges TE and the other row of resonators 6, among the two rows of resonators 6 in each of the rib-like land portions 3b, 3c by the center in the tread width direction, that connect to the same circumferential main groove 2a or 2c are arranged so that the positions of the narrowed necks 4 in the tread circumferential direction do not overlap when projected onto each other in the tread width direction. This can further suppress the pattern noise caused by the resonators 6. However, the positions, in the tread circumferential direction, of the resonators 6 in each of the rib-like land portions 3a, 3d adjacent to the tread edges TE and the other row of resonators 6, among the two rows of resonators 6 in the rib-like land portions 3b, 3c by the center in the tread width direction, that connect to the same circumferential main groove 2a, 2c can instead be aligned.

In the illustrated example, the resonators 6 in each of the rib-like land portions 3a, 3d adjacent to the tread edges TE and the one row of resonators 6, among the two rows of resonators 6 in each of the rib-like land portions 3b, 3c by the center in the tread width direction, that connects to the circumferential main groove 2b on the tire equatorial plane CL are arranged in phase in the tread circumferential direction. The resonators 6 in each of the rib-like land portions 3a, 3d adjacent to the tread edges TE and the one row of resonators 6, among the two rows of resonators 6 in each of the rib-like land portions 3b, 3c by the center in the tread width direction, that connects to the circumferential main groove 2b on the tire equatorial plane CL can instead be arranged so that the positions of the narrowed necks 4 in the tread circumferential direction do not overlap when projected onto each other in the tread width direction.

In the tread pattern illustrated in FIG. 1, the widthwise sipes 4 of the resonators 6 adjacent to each other in the tread width direction have different positions from each other in the tread circumferential direction. This can even further suppress the pattern noise.

As illustrated in FIG. 1, in the present embodiment, the narrowed neck 4 is a widthwise sipe extending in the tread width direction. In the illustrated example, the narrowed neck (widthwise sipe) 4 opens at one end to a circumferential main groove 2 defining a rib-like land portion 3, extends from the one end in the tread width direction, and terminates at the other end within the rib-like land portion 3. In the illustrated example, each narrowed neck (widthwise sipe) 4 extends along the tread width direction (without inclination), but at least some (some or all) of the narrowed necks (widthwise sipes) 4 can also extend at an inclination relative to the tread width direction, in which case the narrowed necks (widthwise sipes) 4 are preferably inclined at an angle of 45° or less relative to the tread width direction and are more preferably inclined at an angle of 30° or less. As a result of the narrowed neck (widthwise sipe) 4 extending at an inclination relative to the tread width direction, the pattern noise can be even further suppressed.

Figure 2:
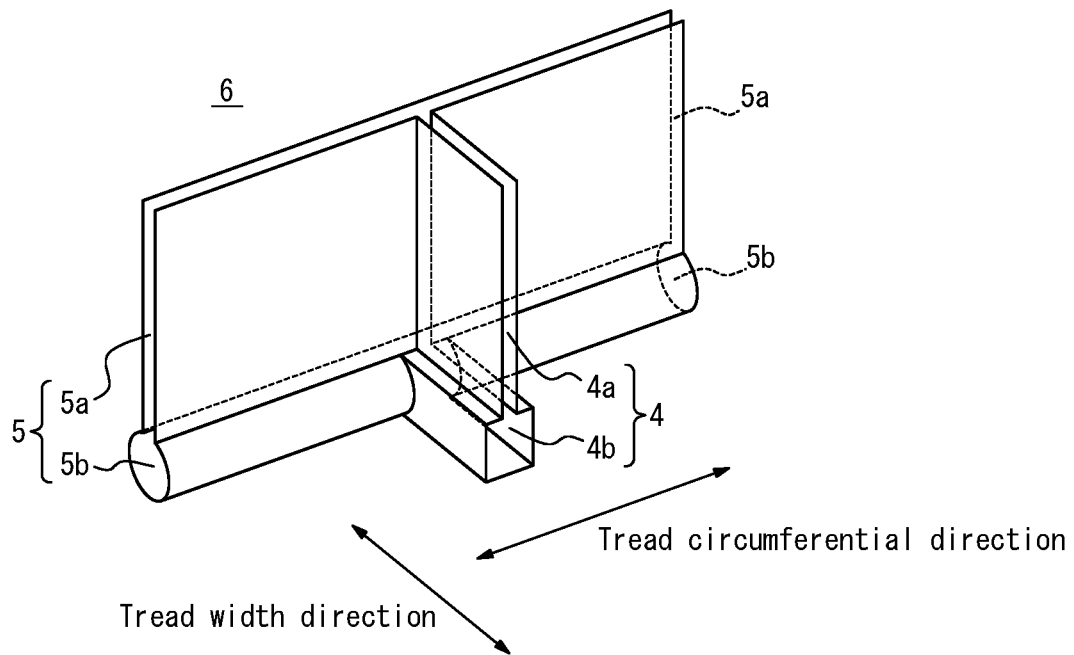
FIG. 2 is a perspective view schematically illustrating an example of a resonator.

FIG. 2 is a perspective view schematically illustrating an example of a resonator. As schematically illustrated in FIG. 2, the narrowed neck (widthwise sipe) 4 in the present example includes a second widened portion 4b, at the sipe bottom side, in which the sipe width (sipe width measured perpendicularly to the extending direction of the sipe) is larger than at the tread surface 1 side. In greater detail, the narrowed neck (widthwise sipe) 4 in the present example includes, in the depth direction of the sipe, a constant sipe width portion 4a in which the sipe width is constant at the same width as the opening width, and a second widened portion 4b in which the sipe width is larger than that of the constant sipe width portion 4a. The sipe width (maximum width) of the second widened portion 4b is not particularly limited but is preferably 2 to 10 times the opening width of the widthwise sipe 4 at the tread surface 1 (that is, the sipe width of the constant sipe width portion 4a in the present example). In the present example, the second widened portion 4b has a rectangular cross-section, and the sipe width is constant in the depth direction of the sipe, but the sipe width can also be variable. For example, the shape may be a circular cross-section, an elliptical cross-section (the sipe depth direction can be larger or smaller than the sipe width direction), a triangular cross-section, or the like. The extension length of the second widened portion 4b in the depth direction of the sipe is not particularly limited but can be 20% to 50% of the depth of the narrowed neck (widthwise sipe) 4.

The narrowed neck (widthwise sipe) 4 can also be configured without the second widened portion 4b, that is, the narrowed neck (widthwise sipe) 4 can be configured with only a constant sipe width portion 4a in which the sipe width is constant in the depth direction of the sipe at the same width as the opening width. Alternatively, the narrowed neck (widthwise sipe) 4 can be configured with a plurality of second widened portions 4b in the depth direction of the widthwise sipe 4. In the case in which the second widened portion 4b is provided, the sipe bottom is the second widened portion 4b in the present example, but the sipe bottom need not necessarily be the second widened portion 4b. For example, a configuration can be adopted so that the second widened portion 4b is provided between a constant sipe width portion 4a in which the sipe width on the tread surface 1 side is constant at the same width as the opening width, and a constant sipe width portion 4a in which the sipe width at the sipe bottom is constant at the same width as the opening width. In this case, at least a portion of the constant sipe width portion 4a in which the sipe width at the sipe bottom is constant at the same width as the opening width is preferably located inward in the tire radial direction from a wear indicator.

In the present example, the portion farther outward in the tire radial direction than the second widened portion 4b is the constant sipe width portion 4a that has a constant sipe width, but this portion can also be a portion with a variable sipe width.

Returning to FIG. 1, in the present embodiment, the air chamber 5 is a circumferential sipe extending in the tread circumferential direction. In the illustrated example, the air chamber (circumferential sipe) 5 is connected to the other end of the widthwise sipe 4, and both ends terminate in the rib-like land portion 3. As illustrated in FIG. 1, the air chambers (circumferential sipes) 5 are not connected with each other between two resonators 6 adjacent in the tread circumferential direction among the plurality of resonators 6 arrayed in the tread circumferential direction.

The air chambers (circumferential sipes) 5 extend along the tread circumferential direction (without inclination) in the illustrated example, but at least some (some or all) of the air chambers (circumferential sipes) 5 can also extend at an inclination relative to the tread circumferential direction, in which case the air chambers (circumferential sipes) 5 are preferably inclined at an angle of less than 45° relative to the tread circumferential direction and are more preferably inclined at an angle of 30° or less.

In the rib-like land portions $3b$, $3c$ by the center in the tread width direction in the illustrated example, the circumferential sipes 5 of the one row of resonators 6 and the circumferential sipes 5 of the other row of resonators 6 are arranged so as to partially overlap when projected in the tread width direction. As a result, an edge component relative to the tread width direction can be secured by the circumferential sipes 5 over the entire tread circumferential direction. Conversely, the circumferential sipes 5 of the one row of resonators 6 and the circumferential sipes 5 of the other row of resonators 6 can be configured not to have an overlapping portion when projected in the tread width direction.

As schematically illustrated in FIG. 2, the air chamber (circumferential sipe) 5 in the present example includes a first widened portion $5b$, at the sipe bottom side, in which the sipe width (sipe width measured perpendicularly to the extending direction of the sipe) is larger than at the tread surface 1 side. In greater detail, the air chamber (circumferential sipe) 5 in the present example includes, in the depth direction of the sipe, a constant sipe width portion $5a$ in which the sipe width is constant at the same width as the opening width, and a first widened portion $5b$ in which the sipe width is larger than that of the constant sipe width portion $5a$. The sipe width (maximum width) of the first widened portion $5b$ is not particularly limited but is preferably 2 to 10 times the opening width of the circumferential sipe 5 at the tread surface 1 (that is, the sipe width of the constant sipe width portion $5a$ in the present example). In the present example, the first widened portion $5b$ is shaped to have a circular cross-section, but other shapes may be adopted, such as an elliptical cross-section (the sipe depth direction can be larger or smaller than the sipe width direction), a triangular cross-section, a rectangular cross-section, and the like. The extension length of the first widened portion $5b$ in the depth direction of the sipe is not particularly limited but can be 20% to 50% of the depth of the air chamber (circumferential sipe) 5. The sipe bottom is the first widened portion $5b$ in the present example, but the sipe bottom need not necessarily be the first widened portion $5b$. For example, a configuration can be adopted so that the first widened portion $5b$ is provided between a constant sipe width portion $5a$ in which the sipe width on the tread surface 1 side is constant at the same width as the opening width, and a constant sipe width portion $5a$ in which the sipe width at the sipe bottom is constant at the same width as the opening width. In this case, at least a portion of the constant sipe width portion $5a$ in which the sipe width at the sipe bottom is constant at the same width as the opening width is preferably located inward in the tire radial direction from a wear indicator.

In the present example, the portion farther outward in the tire radial direction than the first widened portion $5b$ is the constant sipe width portion $5a$ that has a constant sipe width, but this portion can also be a portion with a variable sipe width.

In the example illustrated in FIG. 2, the extension length in the sipe depth direction of the second widened portion $4b$ of the narrowed neck (widthwise sipe) 4 is the same as the extension length in the sipe depth direction of the first widened portion $5b$ of the air chamber (circumferential sipe) 5 but may instead be longer or shorter.

The second widened portion $4b$ of the narrowed neck (widthwise sipe) 4 and the first widened portion $5b$ of the air chamber (circumferential sipe) 5 are directly connected in the example illustrated in FIG. 2 but need not be directly connected. For example, as described below in the examples of FIGS. 4 and 5, the second widened portion $4b$ and the first widened portion $5b$ may be connected via the constant sipe width portions $4a$, $5a$ in which the sipe width is constant.

The effects of the pneumatic tire according to the present embodiment are described below.

The pneumatic tire of the present embodiment includes a plurality of resonators 6 arrayed in the rib-like land portions 3 in the tread circumferential direction, each resonator 6 including the narrowed neck 4 and the air chamber 5. In the pneumatic tire of the present embodiment, one end of the narrowed neck (widthwise sipe) 4 opens to a circumferential main groove 2 defining a rib-like land portion 3. As a result, the air column resonance sound generated in the circumferential main groove 2 to which the resonator 6 is connected by the narrowed neck 4 is reduced, thereby enhancing the quietness of the tire.

Also, in the present embodiment, the air chamber 5 is connected to the other end of the widthwise sipe 4, extends in the tread circumferential direction, terminates at both ends in the rib-like land portion 3, and includes the first widened portion $5b$, at the sipe bottom side, in which the sipe width is larger than at the tread surface 1 side. As a result, when the first widened portion $5b$ appears on the tread surface 1 during wear, the first widened portion $5b$ can function as a groove. Hence, even after the depth of the circumferential main groove 2 is reduced due to wear, the drainage performance can be secured by the first widened portion $5b$. When wear progresses, the rigidity of the rib-like land portions 3, which are defined by the circumferential main grooves 2, increases to the extent that the depth of the circumferential main grooves 2 decreases, thereby securing the steering stability.

Furthermore, in the present embodiment, a widthwise sipe is used as the narrowed neck 4, and a circumferential sipe is used as the air chamber 5. The generation of pattern noise can therefore be suppressed as compared to the case of forming the air chamber with a groove, for example, and the generation of pattern noise can also be suppressed as compared to the case of increasing the extension length of the widthwise groove or the widthwise sipe to secure the volume of the air chamber 5, for example.

As described above, according to the pneumatic tire of the present embodiment, the quietness can be enhanced by reducing air column resonance sound while suppressing the generation of pattern noise.

Furthermore, in the present embodiment, the narrowed neck 4 is a widthwise sipe, and the air chamber 5 is a circumferential sipe. From when the tire is new to the early stage of wear, the amount of wear of the circumferential main groove 2 is still small, and the groove depth is secured. The drainage performance can therefore be secured mainly by the circumferential main grooves 2. On the other hand, since the narrowed neck 4 and the air chamber 5 are not grooves but sipes, the rigidity of the land portions can be secured from when the tire is new to the early stage of wear to ensure the steering stability. In particular, since the widthwise sipe 4 includes the constant sipe width portion 4a, the rigidity of the land portions can be further secured to further ensure the steering stability. Similarly, since the circumferential sipe 5 includes the constant sipe width portion 5a, the rigidity of the land portions can be further secured to further ensure the steering stability.

In the present embodiment, the narrowed neck (widthwise sipe) 4 extends from one end in the tread width direction and terminates at the other end within the rib-like land portion 3. The rigidity of the land portion can thus be improved and the steering stability ensured without dividing the land portion into blocks.

According to the pneumatic tire of the present embodiment, both steering stability and drainage performance can thus be achieved from when the tire is new to the early stage of wear, and both steering stability and drainage performance can also be achieved when wear progresses.

Additionally, in the present embodiment, the circumferential sipe 5 extends from the other end of the widthwise sipe 4 towards both sides in the tread circumferential direction. A well-balanced arrangement of edge components relative to the tread width direction can thus be achieved.

In the present embodiment, the circumferential sipe 5 extends along the tread circumferential direction or extends at an inclination relative to the tread circumferential direction with an inclination angle of less than 45°. By use of the aforementioned angle range, the generation of pattern noise by the resonator 6 can be further suppressed.

In the present embodiment, the widthwise sipe 4 extends along the tread width direction or extends at an inclination relative to the tread width direction with an inclination angle of 45° or less. By use of the aforementioned angle range, the edge component relative to the tread circumferential direction can be increased.

In the present embodiment, the circumferential sipe 5 has a maximum width at the first widened portion 5b that is 2 to 10 times (more preferably 3 to 5 times) the opening width at the tread surface 1. By the maximum width at the first widened portion 5b being two or more times the opening width at the tread surface 1, the drainage performance when wear progresses can be further improved, whereas by the maximum width at the first widened portion 5b being ten or less times the opening width at the tread surface 1, the steering stability when wear progresses can be sufficiently ensured.

In the present embodiment, the widthwise sipe 4 includes the second widened portion 4b, at the sipe bottom side, in which the sipe width is larger than at the tread surface 1 side. A large communication portion between the narrowed neck 4 and the air chamber 5 can thus be secured at the sipe bottom side, which more reliably achieves the effect of reducing the air column resonance sound.

In the present embodiment, the sipe width of the second widened portion 4b is 2 to 10 times (more preferably 2 to 3 times) the opening width of the widthwise sipe 4 at the tread surface 1. By the sipe width of the second widened portion 4b being two or more times the opening width of the widthwise sipe 4 at the tread surface 1, a large communication portion between the narrowed neck 4 and the air chamber 5 can be secured at the sipe bottom side, which can further enhance the effect of more reliably achieving a reduction in the air column resonance sound. On the other hand, by the sipe width of the second widened portion 4b being ten or less times the opening width of the widthwise sipe 4 at the tread surface 1, the rigidity of the rib-like land portion 3 can be further increased.

Next, variations of the resonator 6 will be described.

Figure 3:
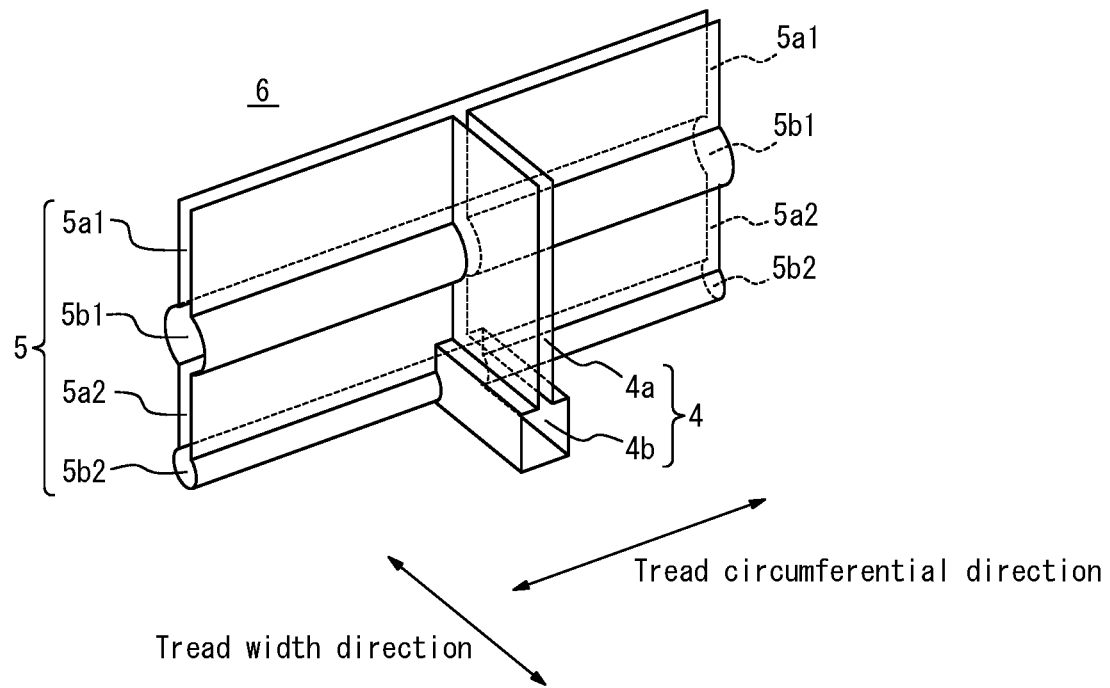
FIG. 3 is a perspective view schematically illustrating another example of a resonator.

FIG. 3 is a perspective view schematically illustrating another example of a resonator. The resonator 6 illustrated in FIG. 3 is similar to the example illustrated in FIG. 2 with respect to the configuration of the narrowed neck (widthwise sipe) 4, and hence a description is omitted. In the example illustrated in FIG. 3, the air chamber (circumferential sipe) 5 has two first widened portions in the depth direction of the sipe.

This configuration can improve the drainage performance twice during progression of wear.

In the example illustrated in FIG. 3, a constant sipe width portion 5a1 on the tread surface 1 side, a first widened portion 5b1 on the tread surface 1 side, a constant sipe width portion 5a2 on the sipe bottom side, and a first widened portion 5b2 on the sipe bottom side are included in order from the tread surface 1 side. The first widened portions 5b1, 5b2 both have a sipe width (maximum width) that is larger than the opening width at the tread surface 1 (that is, the sipe width of the constant sipe width portions 5a1, 5a2 in the present example). Furthermore, in the present example, the sipe width (maximum width) of the first widened portion 5b1 on the tread surface 1 side is larger than the sipe width (maximum width) of the first widened portion 5b2 on the sipe bottom side. However, the sipe width (maximum width) of the first widened portion 5b1 on the tread surface 1 side may instead be the same as or smaller than the sipe width (maximum width) of the first widened portion 5b2 on the sipe bottom side.

The sipe width (maximum width) of the first widened portions 5b1, 5b2 is not particularly limited but is preferably 2 to 10 times, more preferably 4 to 8 times, the opening width of the sipes at the tread surface 1 (that is, the sipe width of the constant sipe width portions 5a1, 5a2 in the present example).

The extension length of the first widened portions 5b1, 5b2 in the depth direction of the sipe is not particularly limited but can be 10% to 30% of the depth of the air chamber (circumferential sipe) 5.

The positions of the first widened portions 5b1, 5b2 in the depth direction of the sipe are not particularly limited. In the present example, the sipe bottom is the first widened portion 5b2, but the sipe bottom need not necessarily be the first widened portion 5b2.

The sipe widths of the two constant sipe width portions 5a1, 5a2 may be the same, or the sipe width of the constant sipe width portion 5a2 on the sipe bottom side may be larger or smaller than the sipe width of the constant sipe width portion 5a1 on the tread surface 1 side.

In the present example, the two first widened portions 5b1, 5b2 are both shaped to have a circular cross-section, but other shapes may be adopted, such as an elliptical cross-section (the sipe depth direction can be larger or smaller than the sipe width direction), a triangular cross-section, a rectangular cross-section, and the like.

In this variation as well, at least some (some or all) of the narrowed necks (widthwise sipes) 4 can extend at an inclination relative to the tread width direction, in which case the narrowed necks (widthwise sipes) 4 are preferably inclined at an angle of 45° or less relative to the tread width direction and are more preferably inclined at an angle of 30° or less.

In this variation as well, at least some (some or all) of the air chambers (circumferential sipes) 5 can also extend at an inclination relative to the tread circumferential direction, in which case the air chambers (circumferential sipes) 5 are preferably inclined at an angle of less than 45° relative to the tread circumferential direction and are more preferably inclined at an angle of 30° or less.

Furthermore, in this variation as well, a portion in which the sipe width varies can be provided instead of the sipe width constant portions Sal, 5a2 in which the sipe width is constant.

Figure 4:
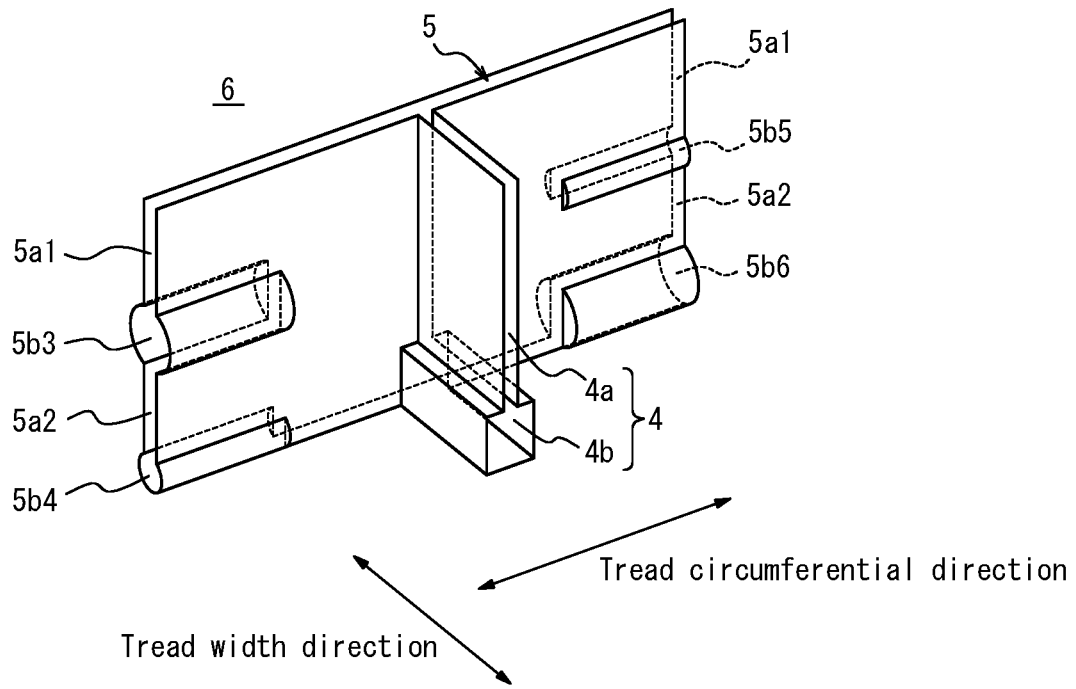
FIG. 4 is a perspective view schematically illustrating a further example of a resonator.

FIG. 4 is a perspective view schematically illustrating a further example of a resonator. The resonator 6 illustrated in FIG. 4 is similar to the examples illustrated in FIGS. 2 and 3 with respect to the configuration of the narrowed neck (widthwise sipe) 4, and hence a description is omitted.

In the example illustrated in FIG. 4, the air chamber (circumferential sipe) 5 has two first widened portions in the depth direction of the sipe.

In the example illustrated in FIG. 4, first widened portions 5b3, 5b4 extend from one end of the circumferential sipe 5 and terminate in the middle (in the illustrated example, at a position midway in the tread circumferential direction between the one end and the widthwise sipe 4), and first widened portions 5b5, 5b6 extend from the other end of the circumferential sipe 5 and terminate in the middle (in the illustrated example, at a position midway in the tread circumferential direction between the other end and the widthwise sipe 4).

This configuration can improve the rigidity of the rib-like land portions 3.

In the example illustrated in FIG. 4, one end of the circumferential sipe 5 includes, in this order from the tread surface 1, a constant sipe width portion Sal on the tread surface 1 side, the first widened portion 5b3 on the tread surface 1 side, a constant sipe width portion 5a2 on the sipe bottom side, and the first widened portion 5b4 on the sipe bottom side.

The other end of the circumferential sipe 5 includes, in this order from the tread surface 1, a constant sipe width portion Sal on the tread surface 1 side, the first widened portion 5b5 on the tread surface 1 side, a constant sipe width portion 5a2 on the sipe bottom side, and the first widened portion 5b6 on the sipe bottom side.

The first widened portions 5b3, 5b4, 5b5, 5b6 all have a sipe width (maximum width) that is larger than the opening width of the sipe at the tread surface 1 (that is, the sipe width of the constant sipe width portions Sal, 5a2 in the present example). Furthermore, at one side of the circumferential sipe 5 in the present example, the sipe width (maximum width) of the first widened portion 5b3 on the tread surface 1 side is larger than the sipe width (maximum width) of the first widened portion 5b4 on the sipe bottom side. On the other hand, at the other side of the circumferential sipe 5, the sipe width (maximum width) of the first widened portion 5b5 on the tread surface 1 side is smaller than the sipe width (maximum width) of the first widened portion 5b6 on the sipe bottom side. This configuration can reduce a step in rigidity in the sipe depth direction.

At one end of the circumferential sipe 5, the sipe width (maximum width) of the first widened portion 5b3 on the tread surface 1 side may be the same as or smaller than the sipe width (maximum width) of the first widened portion 5b4 on the sipe bottom side. At the other end of the circumferential sipe 5, the sipe width (maximum width) of the first widened portion 5b5 on the tread surface 1 side may be the same as or larger than the sipe width (maximum width) of the first widened portion 5b6 on the sipe bottom side.

The relationships between the sipe widths (maximum widths) of the first widened portions 5b3 to 5b6 may be combined in any way (including the case of identical widths).

The sipe width (maximum width) of the first widened portions 5b3 to 5b6 is not particularly limited but is preferably 2 to 10 times, more preferably 4 to 8 times, the opening width of the sipes at the tread surface 1 (that is, the sipe width of the constant sipe width portions Sal, 5a2 in the present example).

The extension length of the first widened portions 5b3 to 5b6 in the depth direction of the sipe is not particularly limited but can be 10% to 30% of the depth of the air chamber (circumferential sipe) 5.

The positions of the first widened portions 5b3 to 5b6 in the depth direction of the sipe are not particularly limited. In the present example, the sipe bottom is the first widened portions 5b4, 5b6, but the sipe bottom need not necessarily be the first widened portions 5b4, 5b6.

The sipe widths of the two constant sipe width portions Sal, 5a2 may be the same, or the sipe width of the constant sipe width portion 5a2 on the sipe bottom side may be larger or smaller than the sipe width of the constant sipe width portion Sal on the tread surface 1 side.

In the present example, the four first widened portions 5b3 to 5b6 are all shaped to have a circular cross-section, but other shapes may be adopted, such as an elliptical cross-section (the sipe depth direction can be larger or smaller than the sipe width direction), a triangular cross-section, a rectangular cross-section, and the like.

In this variation as well, at least some (some or all) of the narrowed necks (widthwise sipes) 4 can extend at an inclination relative to the tread width direction, in which case the narrowed necks (widthwise sipes) 4 are preferably inclined at an angle of 45° or less relative to the tread width direction and are more preferably inclined at an angle of 30° or less.

In this variation as well, at least some (some or all) of the air chambers (circumferential sipes) 5 can also extend at an inclination relative to the tread circumferential direction, in which case the air chambers (circumferential sipes) 5 are preferably inclined at an angle of less than 45° relative to the tread circumferential direction and are more preferably inclined at an angle of 30° or less.

Furthermore, in this variation as well, a portion in which the sipe width varies can be provided instead of the sipe width constant portions Sal, 5a2 in which the sipe width is constant.

Figure 5:
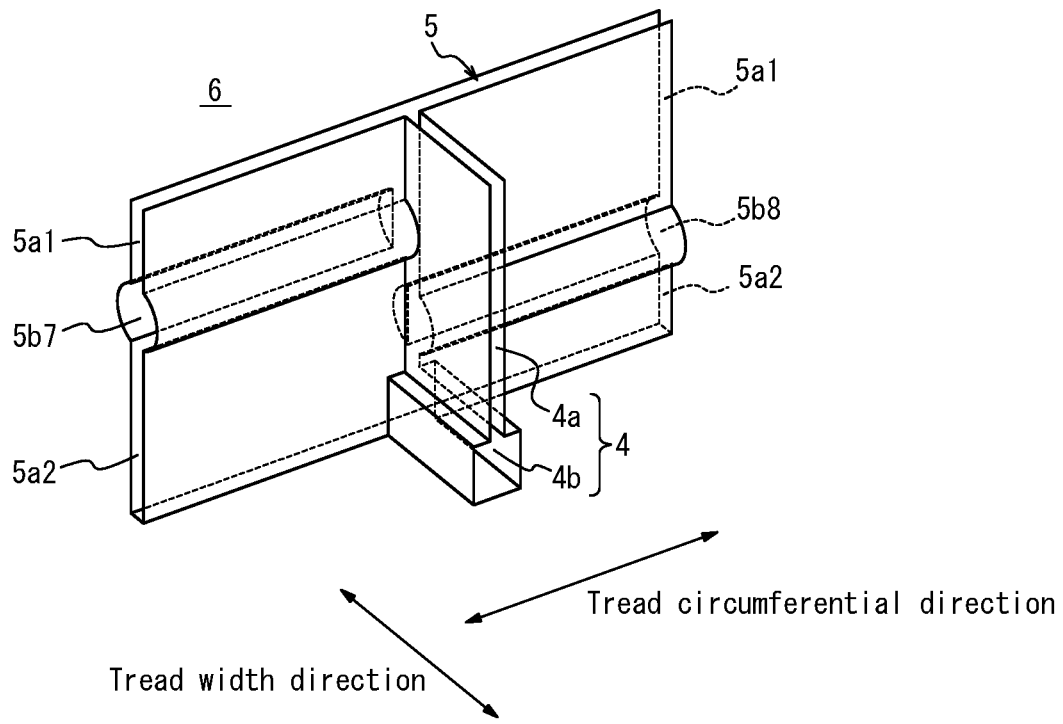
FIG. 5 is a perspective view schematically illustrating an additional example of a resonator.

FIG. 5 is a perspective view schematically illustrating an additional example of a resonator. The resonator 6 illustrated in FIG. 5 is similar to the examples illustrated in FIGS. 2 to 4 with respect to the configuration of the narrowed neck (widthwise sipe) 4, and hence a description is omitted.

In the example illustrated in FIG. 5, the air chamber (circumferential sipe) 5 has one first widened portion in the depth direction of the sipe.

In the example illustrated in FIG. 5, a first widened portion 5b7 extends from one end of the circumferential sipe 5 and terminates in the middle (in the illustrated example, at the position of the widthwise sipe 4), and a first widened portion 5b8 extends from the other end of the circumferential sipe 5 and terminates in the middle (in the illustrated example, at the position of the widthwise sipe 4).

This configuration as well can improve the rigidity of the rib-like land portions 3.

In the example illustrated in FIG. 5, one end of the circumferential sipe 5 includes, in this order from the tread surface 1, a constant sipe width portion Sal on the tread surface 1 side, the first widened portion 5b7, and a constant sipe width portion 5a2 on the sipe bottom side. The other end of the circumferential sipe 5 includes, in this order from the tread surface 1, a constant sipe width portion Sa1 on the tread surface 1 side, the first widened portion 5b8, and a constant sipe width portion 5a2 on the sipe bottom side.

The first widened portions 5b7, 5b8 both have a sipe width (maximum width) that is larger than the opening width at the tread surface 1 (that is, the sipe width of the constant sipe width portions Sa1, 5a2 in the present example). Furthermore, in the present example, the positions in the sipe depth direction of the first widened portion 5b7 at one end of the circumferential sipe 5 and the first widened portion 5b8 at the other end of the circumferential sipe 5 are different. This configuration can reduce a step in rigidity in the sipe depth direction. In the illustrated example, the first widened portion 5b7 at one end of the circumferential sipe 5 is located towards the tread surface 1 from the first widened portion 5b8 at the other end of the circumferential sipe 5 but may instead be located towards the sipe bottom. Alternatively, the positions in the sipe depth direction of the first widened portion 5b7 at one end of the circumferential sipe 5 and the first widened portion 5b8 at the other end of the circumferential sipe 5 can be aligned.

In the illustrated example, the sipe width (maximum width) of the first widened portion 5b7 at one end of the circumferential sipe 5 and the sipe width (maximum width) of the first widened portion 5b8 at the other end of the circumferential sipe 5 are the same, but the sipe width (maximum width) of the first widened portion 5b7 at one end of the circumferential sipe 5 can be larger or smaller than the sipe width (maximum width) of the first widened portion 5b8 at the other end of the circumferential sipe 5.

The sipe width (maximum width) of the first widened portions 5b7, 5b8 is not particularly limited but is preferably 2 to 10 times, more preferably 4 to 8 times, the opening width of the sipes at the tread surface 1 (that is, the sipe width of the constant sipe width portions Sa1, 5a2 in the present example).

The extension length of the first widened portions 5b7, 5b8 in the depth direction of the sipe is not particularly limited but can be 20% to 50% of the depth of the air chamber (circumferential sipe) 5.

The positions of the first widened portions 5b7, 5b8 in the depth direction of the sipe are not particularly limited. In the present example, the sipe bottom is the constant sipe width portion 5a2, but the sipe bottom need not necessarily be the constant sipe width portion 5a2. The first widened portions 5b7, 5b8 at one end and/or the other end of the circumferential sipe 5 can be the sipe bottom.

The sipe widths of the two constant sipe width portions Sa1, 5a2 may be the same, or the sipe width of the constant sipe width portion 5a2 on the sipe bottom side may be larger or smaller than the sipe width of the constant sipe width portion Sa1 on the tread surface 1 side.

In the present example, the two first widened portions 5b7, 5b8 are both shaped to have a circular cross-section, but other shapes may be adopted, such as an elliptical cross-section (the sipe depth direction can be larger or smaller than the sipe width direction), a triangular cross-section, a rectangular cross-section, and the like.

In this variation as well, at least some (some or all) of the narrowed necks (widthwise sipes) 4 can extend at an inclination relative to the tread width direction, in which case the narrowed necks (widthwise sipes) 4 are preferably inclined at an angle of 45° or less relative to the tread width direction and are more preferably inclined at an angle of 30° or less.

In this variation as well, at least some (some or all) of the air chambers (circumferential sipes) 5 can also extend at an inclination relative to the tread circumferential direction, in which case the air chambers (circumferential sipes) 5 are preferably inclined at an angle of less than 45° relative to the tread circumferential direction and are more preferably inclined at an angle of 30° or less.

Furthermore, in this variation as well, a portion in which the sipe width varies can be provided instead of the sipe width constant portions Sa1, 5a2 in which the sipe width is constant.

In each of the above examples, the circumferential sipes preferably extend from the other end of the widthwise sipes towards both sides in the tread circumferential direction. The reason is that a well-balanced arrangement of edge components relative to the tread width direction can be achieved.

The circumferential sipes preferably extend along the tread circumferential direction or extend at an inclination relative to the tread circumferential direction with an inclination angle of less than 45°, more preferably with an inclination angle of 30° or less. The reason is that by use of the aforementioned angle range, the generation of pattern noise by the resonator 6 can be further suppressed. Another reason is that the edge component relative to the tread width direction can be increased. From this perspective, the inclination angle relative to the tread circumferential direction is preferably small, and the circumferential sipes most preferably extend along the tread circumferential direction. On the other hand, the inclination angle relative to the tread circumferential direction is preferably large from the perspective of also increasing the edge component relative to the tread circumferential direction, but the inclination angle relative to the tread circumferential direction is preferably less than 45°.

The widthwise sipes preferably extend along the tread width direction or extend at an inclination relative to the tread width direction, with an inclination angle of 45° or less, more preferably with an inclination angle of 30° or less. The reason is that the edge component relative to the tread circumferential direction can be increased. From this perspective, the inclination angle relative to the tread width direction is preferably small, and the widthwise sipes most preferably extend along the tread width direction. On the other hand, the inclination angle relative to the tread width direction is preferably large from the perspective of also increasing the edge component relative to the tread width direction and from the perspective of further suppressing the generation of pattern noise, but the inclination angle relative to the tread width direction is preferably 45° or less.

The circumferential sipe preferably has a maximum width, at the first widened portion, that is 2 to 10 times the opening width at the tread surface. The reason is that by the maximum width at the first widened portion being two or more times the opening width at the tread surface, the drainage performance when wear progresses can be further improved, whereas by the maximum width at the first widened portion being ten or less times the opening width at the tread surface, the steering stability when wear progresses can be sufficiently ensured. For the same reasons, the circumferential sipe more preferably has a maximum width, at the first widened portion, that is 3 to 5 times the opening width at the tread surface.

The widthwise sipe 4 preferably includes the second widened portion, at the sipe bottom side, in which the sipe width is larger than at the tread surface side. The reason is that a large communication portion between the narrowed neck and the air chamber can be secured at the sipe bottom side, which more reliably achieves the effect of reducing the air column resonance sound.

The sipe width of the second widened portion is preferably 2 to 10 times the opening width of the sipe at the tread surface. The reason is that by the sipe width of the second widened portion being two or more times the opening width of the sipe at the tread surface, a large communication portion between the narrowed neck and the air chamber can be secured at the sipe bottom side, which more reliably achieves the effect of reducing the air column resonance sound. Also, by the sipe width of the second widened portion being ten or less times the opening width of the sipe at the tread surface, the rigidity of the rib-like land portions can be further increased. For the same reasons, the sipe width of the second widened portion is more preferably 2 to 3 times the opening width of the sipe at the tread surface.

The widthwise sipes 4 and circumferential sipes 5 can be formed using blades shaped to correspond to the respective shapes of the sipes.

While some of the disclosed embodiments have been described above, this disclosure is not limited to the foregoing embodiments. For example, in the examples illustrated in FIGS. 2 and 5, one first widened portion is provided in the depth direction of the circumferential sipe, but two or more can be provided instead. For example, in the examples illustrated in FIGS. 3 and 4, two first widened portions are provided in the depth direction of the circumferential sipe, but three or more can be provided instead.

REFERENCE SIGNS LIST

1 Tread surface
2 Circumferential main groove
3 Rib-like land portion
4 Narrowed neck (widthwise sipe)
4a Constant sipe width portion
4b Second widened portion
5 Air chamber (circumferential sipe)
5a, 5a1, 5a2 Constant sipe width portion
5b, 5b1 to 5b8 First widened portion
6 Resonator
CL Tire equatorial plane
TE Tread edge

The invention claimed is:

1. A pneumatic tire comprising, on a tread surface, a plurality of circumferential main grooves extending in a tread circumferential direction, and a plurality of rib-like land portions, each rib-like land portion being defined between circumferential main grooves adjacent in a tread width direction among the plurality of circumferential main grooves, or by the circumferential main groove and a tread edge; and
   a plurality of resonators arrayed in the rib-like land portion in the tread circumferential direction, each resonator including a narrowed neck and an air chamber, wherein
   the narrowed neck is a widthwise sipe opening at one end to one of the circumferential main grooves that defines the rib-like land portion, extending from the one end in the tread width direction, and terminating at another end within the rib-like land portion,
   the air chamber is a circumferential sipe connected to the another end of the widthwise sipe, extending in the tread circumferential direction, terminating at both ends within the rib-like land portion, and including a first widened portion, at one end of the circumferential sipe and at a sipe bottom side, in which a sipe width is larger than at the tread surface side,
   the air chamber further comprises another first widened portion at another end of the circumferential sipe and on an outside in a tire radial direction relative to the first widened portion, in which a sipe width is larger than at the tread surface side,
   positions in a sipe depth direction of the first widened portion at one end of the circumferential sipe and the another first widened portion at the another end of the circumferential sipe are different, and
   the first widened portion at the one end of the circumferential sipe extends from the one end of the circumferential sipe and terminates at a middle of the circumferential sipe between the one end and the another end of the circumferential sipe, and the another first widened portion at the another end of the circumferential sipe extends from the another end of the circumferential sipe and terminates at the middle of the circumferential sipe between the one end and the another end of the circumferential sipe.

2. The pneumatic tire of claim 1, wherein the circumferential sipe extends towards both sides in the tread circumferential direction from the another end of the widthwise sipe.

3. The pneumatic tire of claim 2, wherein the circumferential sipe extends along the tread circumferential direction or extends at an inclination relative to the tread circumferential direction with an inclination angle of less than 45°.

4. The pneumatic tire of claim 3, wherein the widthwise sipe extends along the tread width direction or extends at an inclination relative to the tread width direction with an inclination angle of 45° or less.

5. The pneumatic tire of claim 3, wherein a maximum width of the circumferential sipe in the first widened portion is 2 to 10 times an opening width of the circumferential sipe at the tread surface.

6. The pneumatic tire of claim 2, wherein the widthwise sipe extends along the tread width direction or extends at an inclination relative to the tread width direction with an inclination angle of 45° or less.

7. The pneumatic tire of claim 6, wherein a maximum width of the circumferential sipe in the first widened portion is 2 to 10 times an opening width of the circumferential sipe at the tread surface.

8. The pneumatic tire of claim 2, wherein a maximum width of the circumferential sipe in the first widened portion is 2 to 10 times an opening width of the circumferential sipe at the tread surface.

9. The pneumatic tire of claim 2, wherein the widthwise sipe includes a second widened portion, at a sipe bottom side, in which a sipe width is larger than at the tread surface side.

10. The pneumatic tire of claim 1, wherein the circumferential sipe extends along the tread circumferential direction or extends at an inclination relative to the tread circumferential direction with an inclination angle of less than 45°.

11. The pneumatic tire of claim 10, wherein the widthwise sipe extends along the tread width direction or extends at an inclination relative to the tread width direction with an inclination angle of 45° or less.

12. The pneumatic tire of claim 11, wherein a maximum width of the circumferential sipe in the first widened portion is 2 to 10 times an opening width of the circumferential sipe at the tread surface.

13. The pneumatic tire of claim 10, wherein a maximum width of the circumferential sipe in the first widened portion is 2 to 10 times an opening width of the circumferential sipe at the tread surface.

14. The pneumatic tire of claim 10, wherein the widthwise sipe includes a second widened portion, at a sipe bottom side, in which a sipe width is larger than at the tread surface side.

15. The pneumatic tire of claim 1, wherein the widthwise sipe extends along the tread width direction or extends at an inclination relative to the tread width direction with an inclination angle of 45° or less.

16. The pneumatic tire of claim 15, wherein a maximum width of the circumferential sipe in the first widened portion is 2 to 10 times an opening width of the circumferential sipe at the tread surface.

17. The pneumatic tire of claim 15, wherein the widthwise sipe includes a second widened portion, at a sipe bottom side, in which a sipe width is larger than at the tread surface side.

18. The pneumatic tire of claim 1, wherein a maximum width of the circumferential sipe in the first widened portion is 2 to 10 times an opening width of the circumferential sipe at the tread surface.

19. The pneumatic tire of claim 18, wherein the widthwise sipe includes a second widened portion, at a sipe bottom side, in which a sipe width is larger than at the tread surface side.

20. The pneumatic tire of claim 1, wherein the widthwise sipe includes a second widened portion, at a sipe bottom side, in which a sipe width is larger than at the tread surface side.

\* \* \* \* \*